United States Patent [19]

Engelke et al.

[11] Patent Number: 5,691,419
[45] Date of Patent: Nov. 25, 1997

[54] CARBOXYL-CONTAINING ACRYLATE COPOLYMER AND EPOXY RESIN

[75] Inventors: Stephan Engelke, Wuppertal; Michael Brünnemann, Münster; Olaf Rotter, Everswinkel; Andreas Holst, Neu Wulmstorf, all of Germany

[73] Assignee: BASF Lacke + Farben, AG, Muenster-Hiltrup, Germany

[21] Appl. No.: 167,882

[22] PCT Filed: May 19, 1992

[86] PCT No.: PCT/EP92/01100

§ 371 Date: Feb. 1, 1994

§ 102(e) Date: Feb. 1, 1994

[87] PCT Pub. No.: WO92/22615

PCT Pub. Date: Dec. 23, 1992

[30] Foreign Application Priority Data

Jun. 17, 1991 [DE] Germany ............... 41 19 857.3

[51] Int. Cl.$^6$ .................. C08L 33/02; C08L 33/14; C08L 63/08; C08L 67/02
[52] U.S. Cl. .................. 525/208; 525/65; 525/108; 525/111; 525/117; 525/118; 525/119; 525/209; 525/438
[58] Field of Search ............. 525/65, 108, 111, 525/117, 118, 119, 208, 209, 438

[56] References Cited

U.S. PATENT DOCUMENTS

| 4,190,569 | 2/1980 | Kroker et al. | 524/484 |
| 4,650,718 | 3/1987 | Simpson et al. | 528/112 |
| 4,895,910 | 1/1990 | Isozaki et al. | 525/326.5 |
| 4,923,930 | 5/1990 | Iwasawa et al. | 525/165 |
| 5,079,312 | 1/1992 | Isozaki et al. | 525/479 |
| 5,283,290 | 2/1994 | Jung et al. | 523/434 |

FOREIGN PATENT DOCUMENTS 0358153  3/1990  European Pat. Off. .

*Primary Examiner*—Robert E. Sellers
*Attorney, Agent, or Firm*—Anne Gerry Sabourin; Anna M. Budde

[57] ABSTRACT

A coating agent comprises a binding agent containing at least one acrylate copolymer (A) with carboxyl groups and/or at least one acrylate copolymer (B) with epoxide groups, the acrylate copolymers (A) and (B) being obtained by solution polymerization using less than 5% by weight based on the total weight of monomers of one or more polysiloxane macromonomers $a_1$ having a number-average molecular weight of 1000 to 40,000 and on average 0.5 to 2.5 ethylenically unsaturated double bonds per molecule; and one or more epoxy resins.

20 Claims, No Drawings

CARBOXYL-CONTAINING ACRYLATE COPOLYMER AND EPOXY RESIN

The present invention relates to coating agents which comprise, as the binding agent, at least one polymer containing carboxyl groups and, as the hardener, at least one epoxy resin having on average more than one epoxide group per molecule.

The present invention furthermore relates to processes for the preparation of these coating agents and to their use, and to processes for coating substrates.

Very high quality requirements are imposed in particular on coating agents which are employed in the field of automobile repair painting. Thus, these coating agents must be curable at low temperatures ($\leq 100°$ C., preferably $\leq 80°$ C.) and at the same time already be dry to dust and tack-free after less than 7 hours. A good resistance to solvents, resistance to weathering, resistance to taping, resistance to yellowing and sandability, and a low intrinsic color of the resulting coatings are furthermore required. It must be possible, furthermore, to paint over the coatings, in order thus to guarantee that paint damage in the adjacent region and in the region of the repair paint can also be repaired.

Coating agents based on acrylate copolymers containing carboxyl groups and on epoxy resins which are also used in the field of automobile repair painting have been known for a long time and are described, for example, in EP-B-51 275, EP-A-123793, DE-OS 26 35 177, JP-OS 76 338/77, WO 87/02041 and WO 89/08132. However, these known coating agents have only a low stability to weathering and a low surface slip, and as a result a poor resistance of the resulting coatings to chemicals. Compatibility problems moreover occur between the acrylate copolymers containing carboxyl groups and some epoxy resins.

Coating agents for coating automobiles are furthermore known from EP-A 358153, these comprising either a) a copolymer which is obtainable using polysiloxane macromonomers having at least two functional groups per molecule and vinyl monomers containing epoxide groups, or b) 1 mixture of a polymer (1) based on polysiloxane macromonomers having at least two functional groups and a polymer (2) based on vinyl monomers containing epoxide groups. These coating agents furthermore contain an aluminum chelate compound and/or a titanium chelate compound and/or a zirconium chelate compound as the hardener.

Since the functional groups of the polysiloxane macromonomers contribute toward crosslinking of the coating agents, a very high content of this polysiloxane macromonomer in the copolymer is required to guarantee adequate crosslinking. On the other hand, crosslinking of the coating agents by a carboxy/epoxy reaction is not described in EP-A-358153. These moisture-hardening coating agents known from EP-A-358153 furthermore have the disadvantage of a lower storage stability after drums have been opened and higher production costs of the coating agents.

Moisture-hardening coating agents furthermore are known from DE-OS 38 39 215, these comprising, as the binding agent, a resin which is obtainable by polymerization of a vinyl monomer containing alkoxysilane and/or a polysiloxane macromonomer with a vinyl monomer containing epoxide groups in the presence of a resin containing carboxyl groups. These coating agents in turn contain a chelate compound as the hardener.

A coating agent based on acrylate copolymers containing hydroxyl groups and on polyisocyanates furthermore is known from JP-OS 2163177, this being employed, in particular, as a house paint. The coatings here are distinguished by an improved stability to weathering, which is achieved by copolymerization of 0.5 to 15% by weight of a polysiloxane macromonomer into the acrylate copolymer containing hydroxyl groups. It is also known from U.S. Pat. No. 4,754,014 that the weathering resistance of coating agents based on acrylate copolymers containing hydroxyl groups can be improved by modification with polysiloxane macromonomers. However, coating agents based on acrylate copolymers containing carboxyl groups and on epoxy resins are not described in JP-OS 2163177 and U.S. Pat. No. 4,754,014.

It is known from EP-B 175 092 that the flow properties and the frictional properties and scratch resistance of coatings can be improved by adding siloxanes, which are free from polyether groups and modified by polyester, to the coating agents. The use of polymerizable, ethylenically unsaturated polysiloxane macromonomers for the modification of binding agents based on acrylate copolymers is not described in EP-B 175092.

Finally, coating agents based on epoxy-functional polymers and on polymers containing carboxyl groups are known from EP-A-212 457, these being particularly suitable for metallic multicoat painting. Both the polymer containing epoxide groups and the polymer containing carboxyl groups can be modified by using silane-functional monomers, such as, for example, γ-methacryloxypropyl-trimethoxysilane or mercaptopropyltrimethoxysilane. Alternatively, compounds containing silane groups, such as, for example, methyltrimethoxysilane, can also be added directly to the coatings. However, EP-A-212 457 contains no data on suitable amounts of the silane components to be used. Furthermore, there is also no indication of the use of polysiloxane macromonomers. These coating agents known from EP-A-212 457 show only a small improvement in the surface properties of the resulting coatings, such as, for example, water- and chemicals-repellency.

The present invention is thus based on the object of providing coating agents which are based on acrylate copolymers containing carboxyl groups and on epoxy resins and which lead to coatings which can be painted over, have a good resistance to weathering, a good resistance to solvents and chemicals, a good top coat appearance and adequate scratch resistance. For use in the field of automobile repair painting, the coating agents furthermore should be hardenable at low temperatures and at the same time lead to surfaces which are dry to dust and tack-free after the shortest possible time. The coating agents furthermore should be sandable, it should also be possible to paint over them without sanding the surface and they should have a good resistance to taping and uptake of spray mist.

This object is achieved, surprisingly, by a coating agent which comprises, as the binding agent, at least one polymer containing carboxyl groups and, as the hardener, at least one epoxy resin having on average more than one epoxide group per molecule. The coating agent is characterized in that it comprises at least one acrylate copolymer (A) which contains carboxyl groups and is obtainable by solution polymerization using less than 5% by weight, based on the total weight of the monomers employed for the preparation of copolymer (A), of one or more polysiloxane macromonomers al having a number-average molecular weight of 1000 to 40,000 and on average 0.5 to 2.5 ethylenically unsaturated double bonds per molecule, and/or if appropriate one or more further epoxy resins.

The present invention furthermore relates to a process for the preparation of coating agents according to one of claims 1 to 11, in which at least one polymer containing carboxyl groups, as the binding agent, at least one epoxy resin, as the hardener, one or more organic solvents, if appropriate pigments and/or fillers and if appropriate further auxiliaries and additives are mixed and if appropriate dispersed, characterized in that A) at least one acrylate copolymer (A) which contains carboxyl groups and is obtainable by solution polymerization using less than 5% by weight, based on the total weight of the monomers employed for the preparation of copolymer (A), of one or more polysiloxane macromonomers al having a number-average molecular weight of 1000 to 40,000 and on average 0.5 to 2.5 ethylenically unsaturated double bonds per molecule, and/or B) if appropriate one or more further epoxy resins are employed for the preparation of the coating agents.

The present invention furthermore relates to processes for coating substrates, in which these coating agents are applied, and to the use of these coating agents.

It is surprising and was not foreseeable that precisely the modification according to the invention of coating agents based on binding agents containing carboxyl groups and on crosslinking agents containing epoxide groups leads, by incorporation of polysiloxane macromonomers, to coating agents which are distinguished by the resulting coatings having a good capacity for being painted over and a good resistance to weathering, chemicals and solvents. A significant improvement in the resistance to taping, the scratch resistance, the spray-ability and the top coat appearance (DOI) is furthermore advantageous.

It is essential to the invention that the coating agents comprise either at least one acrylate copolymer (A) which contains carboxyl groups and is modified by the polysiloxane macromonomers $a_1$, or at least one acrylate copolymer (B) which contains epoxide groups and is modified by the polysiloxane macromonomers $a_1$ or both at least one modified acrylate copolymer (A) containing carboxyl groups and at least one modified acrylate copolymer (B) containing epoxide groups. Coating agents which comprise either only (A) or (B) as the modified component are preferred. Coating agents which comprise at least one modified acrylate copolymer (B) containing epoxide groups furthermore comprise, as the crosslinking component, at least one condensation and/or addition resin containing carboxyl groups. Coating agents which comprise at least one modified acrylate copolymer (A) containing carboxyl groups accordingly also comprise, as the crosslinking component, at least one epoxy resin. Coating agents which comprise at least one acrylate copolymer (A) which contains carboxyl groups and is modified by the polysiloxane macromonomers $a_1$, if appropriate further addition and/or condensation resins (C) containing carboxyl groups and, as the crosslinking agent, epoxy resins (component D) which are not modified by $a_1$ are particularly preferred. Where possible, acrylate copolymers containing epoxide groups are not used as the crosslinking agent, in particular because of toxicological aspects.

Coating agents which comprise at least one acrylate copolymer (A) which contains carboxyl groups and is modified by the polysiloxane macromonomers $a_1$, at least one polyester (C) containing carboxyl groups and at least one epoxy resin (D) are especially preferred. The individual constituents of the coating agents according to the invention will now first be illustrated in more detail below.

It is essential to the invention that the coating agents contain at least one acrylate copolymer which has been modified by incorporation of one or more polysiloxane macromonomers $a_1$. Polysiloxane macromonomers which have a number-average molecular weight of 1000 to 40,000, preferably of 2000 to 10000, and on average 0.5 to 2.5, preferably 0.5 to 1.5, ethylenically unsaturated double bonds per molecule are suitable both for modification of acrylate copolymers (A) containing carboxyl groups and for modification of acrylate copolymers (B) containing epoxide groups.

Suitable components $a_1$ are, for example, the polysiloxane macromonomers described in DE-OS 38 07 571 on pages 5 to 7, those described in DE-OS 37 06 095 in columns 3 to 7, those described in EP-B 358 153 on pages 3 to 6 and those described in U.S. Pat. No. 4,754,014 in columns 5 to 9.

Other acryloxysilane-containing vinyl monomers having the abovementioned molecular weights and contents of ethylenically unsaturated double bonds furthermore are also suitable, for example compounds which can be prepared by reaction of hydroxyl-functional silanes with epichlorohydrin and subsequent reaction of the reaction product with (meth) acrylic acid and/or hydroxyalkyl esters of (meth)acrylic acid.

Polysiloxane macromonomers of the following formula are preferably employed as component $a_1$:

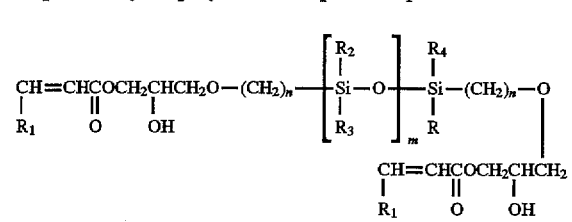

where $R_1$=H or $CH_3$ $R_2$, $R_3$, $R_4$ and $R_5$=identical or different aliphatic hydrocarbon radicals having 1 to 8 C atoms, in particular methyl, or the phenyl radical n=2 to 5, preferably 3 m=8 to 30

The α,ω-acryloxyorganofunctional polydimethoxysiloxane of the formula

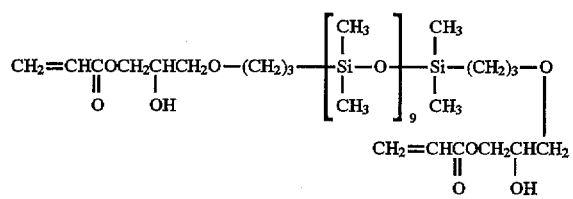

with n≈9, an acryloxy equivalent of 550 g/equivalent, an OH number of 102 mg of KOH/g and a viscosity of 240 mPas (25° C.) is particularly preferably employed.

Polysiloxane macromonomers which are preferably employed as component $a_1$ are also those which have been prepared by reaction of 70 to 99,999 mol % of a compound (1) represented by the formula (1)

in which $R_1$ represents an aliphatic hydrocarbon group with to 8 C atoms or a phenyl radical and $R_2$, $R_3$ and $R_4$ in each case represent a halogen radical or an alkoxy radical having 1 to 4 C atoms or a hydroxyl group, with 30 to 0,001 mol % of a compound (2), represented by the formula (II)

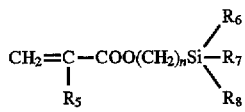

in which $R_5$ represents a hydrogen atom or a methyl radical, $R_6$, $R_7$ and $R_8$ in each case represent halogen, OH or an alkoxy radical having 1 to 4 C atoms or an aliphatic hydrocarbon group having 1 to 8 C atoms, at least one of the radicals $R_6$, $R_7$ or $R_8$ being OH or an alkoxygroup, and n represents an integer from 1 to 6.

In the compound (1), examples of alkoxy groups having 1 to 4 C atoms are straight-chain or branched groups, such as, for example, methoxy, ethoxy, propoxy, butoxy and the like. Examples of aliphatic hydrocarbon groups are straight-chain or branched aliphatic hydro-carbon groups, such as methyl, ethyl, propyl, butyl, pentyl, hexyl, heptyl, octyl and the like. Methyl and phenyl are particularly preferred as $R_1$ in the compound (1). Methoxy, ethoxy, propoxy, butoxy and hydroxyl are preferred as $R_2$, $R_3$ and $R_4$. Examples of preferred compounds (1) are methyltrimethoxysilane, phenyltrimethoxysilane, butyltrimethoxysilane, methyltriethoxysilane, methyltributoxysilane, phenyltrisilanol, methyltrisilanol and the like, of which methyltrimethoxysilane, phenyltrimethoxysilane and phenyltrisilanol are particularly preferred. These compounds can be used by themselves or in combination.

In the above compound (2), $R_5$ represents a hydrogen atom or a methyl group and $R_6$, $R_7$ and $R_8$ in each case represent hydroxyl, alkoxy having 1 to 4 carbon atoms or an aliphatic hydrocarbon group having 1 to 8 carbon atoms. n is an integer from 1 to 6. $R_6$, $R_7$ and $R_8$ can all be identical or different or at least one of these groups can differ from the others. However, at least one of this group is hydroxyl or alkoxy.

In the compound (2), examples of aliphatic hydrocarbon groups having 1 to 8 carbon atoms and alkoxy groups having 1 to 4 carbon atoms are those which have been mentioned for compound (1). Methoxy, ethoxy and hydroxyl groups are particularly preferred as $R_6$, $R_7$ and $R_8$, and n is preferably in the range from 2 to 4. Examples of preferred compounds (2) are
γ-acryloxyethyltriethoxysilane,
γ-methacryloxyethyltriethoxysilane,
γ-methacryloxypropyltrimethoxysilane,
γ-methacryloxypropyltriethoxysilane,
γ-acryloxypropyltrimethoxysilane,
γ-methacryloxybutyltriethoxysilane,
γ-acryloxypropyltrisilanol and the like.

Amongst these examples,
γ-acryloxyethyltriethoxysilane,
γ-methacryloxyethyltriethoxysilane,
γ-methacryloxypropyltrimethoxysilane,
γ-methacryloxypropyltriethoxysilane and
γ-acryloxypropyltrisilanol
are particularly preferred.

These compounds can be employed individually or in combination.

The reaction between compounds (1) and (2) is effected by dehydrating condensation of the hydroxyl groups contained in these compounds and/or of the hydroxyl groups which are due to hydrolysis of the alkoxy groups of these compounds. Depending on the reaction conditions, the reaction comprises, in addition to the dehydrating reaction, a dealcoholizing condensation. If the compounds (1) or (2) contain halogen radicals, the reaction between (1) and (2) is effected by dehydrohalogenation.

Although the reaction can be carried out in the absence of solvents, it is desirable to carry out the reaction in water and/or an organic solvent in which the two compounds (1) and (2) are soluble. Examples of suitable organic solvents are hydrocarbon solvents, such as, for example, heptane, toluene, xylene, octane and white spirit, ester solvents, such as, for example, ethyl acetate, n-butyl acetate, isobutyl acetate, methylcellusolve acetate and butylcarbitol acetate, ketone solvents, such as, for example, methyl ethyl ketone, methyl isobutyl ketone and diisobutyl ketone, alcoholic solvents, such as, for example, ethanol, isopropanol, n-butanol, sec-butanol and isobutanol, ether solvents, such as, for example, n-butyl ether, dioxane, ethylene glycol monomethyl ether and ethylene glycol monoethyl ether, and the like. These solvents can be used individually or in combination.

If the compounds (1) and (2) are used in the form of a solution, the total concentration of these compounds in the solution is suitably at least 5% by weight. The compounds (1) and (2) are reacted in a suitable manner at temperatures from approximately 20° to approximately 180° C., preferably approximately 50° to approximately 120° C. The reaction time is suitably usually approximately 1 to approximately 40 hours.

If appropriate, the reaction can be carried out in the presence of a polymerization inhibitor which effectively prevents the polymerization reaction on the basis of unsaturated bonds in the compound (2). Examples of suitable inhibitors are hydroquinone, hydroquinone monomethyl ether and similar quinone compounds. The reaction system of the compounds (1) and (2) for the preparation of the polysiloxane macromonomers can comprise tetraalkoxysilane, dialkyldialkoxysilane or the like, which are employed in an amount of up to approximately 20 mol %, based on the total weight of compounds (1) and (2). If $R_2$, $R_3$, $R_4$, $R_6$, $R_7$ and $R_8$ in the compounds (1) and (2) all represent hydroxyl, it is desirable to carry out the reaction in an organic solvent, while heating and stirring, for the purpose of dehydrating condensation. If furthermore at least one of the compounds (1) and (2) contains Si-bonded alkoxy groups, it is preferable to carry out a hydrolysis before the condensation. It becomes necessary to carry out the hydrolysis if all the groups $R_2$, $R_3$, $R_4$, $R_6$, $R_7$ and $R_8$ are alkoxy groups. The hydrolysis reaction and the condensation reaction can be carried out continuously in the presence of water and a catalyst, while heating and stirring. The amount of water used for this reaction is preferably at least approximately 0.1 mol per mol of alkoxy, although it is not limited in particular. If less than 0.1 mol of water is present, the two compounds tend to become less reactive. The use of a large excess of water is particularly preferred. In the case where the condensation reaction produces an alcohol which is sparingly soluble in water, the use of a combination of water and a water-soluble organic solvent serves to render the reaction system homogeneous. The above-mentioned alcoholic ester, ether and ketone solvents are preferably used as the water-soluble organic solvent. Acid or alkaline catalysts can be employed as catalysts for the hydrolysis reaction. Examples of suitable acid catalysts are hydrochloric acid, sulfuric acid, phosphoric acid, formic acid, acetic acid, propionic acid, acrylic acid, methacrylic acid and the like.

Examples of suitable alkaline catalysts are sodium hydroxide, triethylamine, ammonia and the like. It is advantageous to employ the catalyst in an amount of approximately 0.0001 to approximately 5% by weight, preferably approximately 0.01 to approximately 0.2% by weight, based on the total amount of the compounds (1) and (2).

The amount of polysiloxane macromonomer or macromonomers $a_1$ employed for modification of the acrylate copolymer (A) containing carboxyl groups is less than 5% by weight, preferably 0.05 to 2.5% by weight, particularly preferably less than 1% by weight and especially preferably 0.05 to 0.5% by weight, in each case based on the total weight of the total monomers (including al) employed for the preparation of copolymer (A).

The amount of polysiloxane macromonomer or macromonomers $a_1$ employed for modification of the acrylate copolymer (B) containing epoxide groups is less than 5% by weight, preferably 0.05 to 2.5% by weight, particularly preferably less than 1% by weight and especially preferably 0.05 to less than 0.5% by weight, in each case based on the total weight of the total monomers (including $a_1$) employed for the preparation of copolymer (B).

An increase in content of polysiloxane macromonomer or macromonomers $a_1$ here leads to a decrease in the capacity of the resulting coatings for being painted over, the occurrence of flow disturbances and clouding of the acrylate copolymer solution and the coating agents prepared therefrom, and to siliconization of the spray plant and therefore problems in changing the paint.

The most favorable content of polysiloxane macromonomer(s) in each case therefore depends on the desired properties of the coatings and hence on the intended use. However, the most favorable amount to be employed for the particular intended use can be determined easily with the aid of a few experiments.

To prepare the acrylate copolymers (A) containing carboxyl groups, all the monomers usually employed can be used together with the polysiloxane macromonomers. Acrylate copolymers (A) which are preferably employed are obtainable by copolymerization of $a_1$) 0.05 to 2.5% by weight, preferably 0.05 to 0.5% by weight, of one or more polysiloxane macromonomers $a_1$, $a_2$) 0 to 40% by weight, preferably 0 to 30% by weight, of one or more ethylenically unsaturated monomers containing carboxyl groups, $a_3$) 0 to 40% by weight, preferably 0 to 30% by weight, of one or more vinylaromatic hydrocarbons, $a_4$) 0 to 99.95% by weight, preferably 20 to 60% by weight, of one or more ethylenically unsaturated monomers containing hydroxyl groups, $a_5$) 0 to 30% by weight, preferably 0 to 20% by weight, of one or more monomers having at least two polymerizable, ethylenically unsaturated double bonds and $a_6$) 0 to 80% by weight of one or more other ethylenically unsaturated copolymerizable monomers, wherein the sum of the parts by weight of components $a_1$ to $a_6$ is in each case 100% by weight and wherein the amounts of components $a_2$ and $a_4$ employed should not both simultaneously be zero.

If this copolymer prepared in this way contains hydroxyl groups, it can be reacted, if appropriate, with carboxylic acid anhydrides in a further stage, the amount of carboxylic acid anhydrides employed being chosen so that the copolymer (A) formed has the desired acid number.

The compounds suitable as component $a_1$ are the polysiloxane macromonomers already described above.

Examples of suitable monomers $a_2$ containing carboxyl groups are unsaturated carboxylic acids, such as, for example, acrylic, methacrylic, itaconic, crotonic, isocrotonic, aconitic, maleic and fumaric acid, half-esters of maleic and fumaric acid, as well as β-carboxyethyl acrylate and adducts of hydroxyalkyl esters of acrylic acid and/or methacrylic acid with carboxylic acid anhydrides, such as, for example, mono-2-methacryloyloxyethyl phthalate. The amounts of component $a_2$ is [sic] 0 to 40% by weight, preferably 0 to 30% by weight.

Component $a_3$ is a monovinylaromatic compound. It preferably contains 8 to 9 carbon atoms per molecule. Examples of suitable compounds are styrene, vinyltoluenes, α-methylstyrene, chlorostyrenes, o-, m- or p-methylstyrene, 2,5-dimethylstyrene, p-methoxystyrene, p-tert-butylstyrene, p-dimethylaminostyrene, p-acetamidostyrene and m-vinylphenol. Vinyltoluenes and, in particular, styrene are preferably employed. The amount of component $a_3$ is 0 to 40% by weight, preferably 0 to 30% by weight.

Possible components $a_4$ are hydroxyalkyl esters of α,β-unsaturated carboxylic acids with primary or secondary hydroxyl groups. Hydroxyalkyl esters with primary hydroxyl groups are predominantly employed, since they have a higher reactivity in the polymer-analogous reaction with the carboxylic acid anhydride. Mixtures of hydroxyalkyl esters having primary hydroxyl groups and hydroxyalkyl esters having secondary hydroxyl groups can of course also be used, for example if hydroxyl groups are required in the copolymer containing carboxyl groups, for example for establishing compatibility of the copolymer containing carboxyl groups.

Examples of suitable hydroxyalkyl esters of α,β-unsaturated carboxylic acids having primary hydroxyl groups are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples which may be mentioned of hydroxyalkyl esters which have a secondary hydroxyl group and can be used are 2-hydroxypropyl acrylate, 2-hydroxybutyl acrylate, 3-hydroxybutyl acrylate and the corresponding methacrylates.

The corresponding esters of other α,β-unsaturated carboxylic acids, such as, for example, of crotonic acid and of isocrotonic acid, can in each case of course also be used.

Component $a_4$ advantageously can be at least in part a reaction product of one mol of hydroxyethyl acrylate and/or hydroxyethyl methacrylate and on average two mols of ε-caprolactone.

Compounds which advantageously can be used as component $a_5$ are those of the general formula

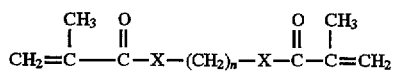

in which:

X=O, NR' or S, where R=H, alkyl or aryl, and n=2 to 8.

Component $a_5$ can be a reaction product with a polymerizable, olefinically unsaturated double bond, acrylic acid being excluded, and glycidyl methacrylate. Saturated and/or unsaturated polycarboxylic acids esterified with an unsaturated alcohol containing a polymerizable double bond, or unsaturated monocarboxylic acids esterified with an unsaturated alcohol containing a polymerizable double bond, with the exception of derivatives of acrylic acid, furthermore are suitable. Components $a_5$ advantageously are chosen from products which are prepared from polyisocyanates with unsaturated alcohols or a mines containing polymerizable double bonds, such as, for example, the reaction product of 1 mol of hexamethylene diisocyanate with 2 mol of allyl alcohol. Esters of polyethylene glycol and/or polypropylene glycol having an average molecular weight of less than 1500, preferably less than 1000, and (meth)acrylic acid furthermore are furthermore possible.

Examples of polyethylenically unsaturated compounds are hexanediol dimethacrylate, glycol dimethacrylate, butanediol dimethacrylate, trimethylolpropane trimethacrylate, divinylbenzene and similar compounds.

If appropriate, other ethylenically unsaturated copolymerizable monomers $a_6$ can also be employed for building up the copolymer (A) containing carboxyl groups. When choosing these monomers, it should be ensured that the incorporation of these monomers $a_6$ does not lead to undesirable properties of the copolymer. The choice of component $a_6$ thus largely depends on the desired properties of the hardenable composition with respect to elasticity, hardness, compatibility and polarity. The content of monomers containing epoxide groups is preferably less than 2% by weight, based on the weight of the monomer mixture. Copolymer (A) is particularly preferably largely free from epoxide groups (<0.1% by weight).

Alkyl esters of olefinically unsaturated carboxylic acids are preferably employed as component $a_6$. Examples of these are methyl (meth)acrylate, ethyl (meth)acrylate, propyl (meth)acrylate, butyl (meth)acrylate, isopropyl (meth) acrylate, isobutyl (meth)acrylate, pentyl (meth)acrylate, isoamyl (meth)acrylate, hexyl (meth)acrylate, cyclohex-yl (meth)acrylate, 2-ethylhexyl (meth)acrylate, octyl (meth) acrylate, 3,5,5-trimethylhexyl (meth)acrylate, decyl (meth) acrylate, dodecyl (meth)acrylate, hexadecyl (meth)acrylate, octadecyl (meth)acrylate, octadecenyl (meth)acrylate and the corresponding esters of maleic, fumaric, tetrahydrophthalic, crotonic, isocrotonic, vinylacetic and itaconic acid.

Compounds which are furthermore suitable as component $a_6$ are other ethylenically unsaturated compounds, such as, for example, alkoxyethyl acrylates, aryloxyethyl acrylates and the corresponding methacrylates, such as, for example, butoxyethyl (meth)acrylate and phenoxyethyl (meth) acrylate; unsaturated compounds having tertiary amino groups, such as, for example, N,N'-diethylaminoethyl methacrylate, 2-vinylpyridine, 4-vinylpyridine, vinylpyrroline, vinylquinoline, vinylisoquinoline, N,N'-dimethylaminoethyl vinyl ether and 2-methyl-5-vinylpyridine; and compounds such as, for example, acrylonitrile, methacrylonitrile, acrolein and methacrolein.

Vinyl esters of monocarboxylic acids, preferably vinyl esters of monocarboxylic acids which are branched in the α-position and have 5 to 15 C atoms per molecule, are also suitable as component as. The branched monocarboxylic acids can be obtained by reaction of formic acid or carbon monoxide and water with olefins in the presence of a liquid, strongly acid catalyst; the olefins can be cracking products of paraffinic hydrocarbons, such as petroleum fractions, and can comprise both branched and straight-chain acyclic and/ or cycloaliphatic olefins. In the reaction of such olefins with formic acid or with carbon monoxide and water, a mixture of carboxylic acids in which the carboxyl group is predominantly on a quaternarycarbon atom is formed. Other olefinic starting substances are, for example, propylene trimer, propylene tetramer and diisobutylene. The vinyl esters can also be prepared from the acids in a manner which is known per se, for example by allowing the acids to react with acetylene.

Vinyl esters of saturated aliphatic monocarboxylic acids which have 9–11 C atoms and are branched on the α-C atom are particularly preferred—because of their good availability. The vinyl ester of p-tert-butylbenzoic acid is moreover particularly preferred. Examples of further suitable vinyl esters are vinyl acetate and vinyl propionate.

To prepare the acrylate copolymers (B) containing epoxide groups, all the monomers usually employed can likewise be employed together with the polysiloxane macromonomers. The epoxide groups can be introduced into copolymer (B) here by using monomers containing epoxide groups. Copolymers (B) which are preferably employed are obtainable by copolymerization of $e_1$) 0.05 to 2.5% by weight, preferably 0.05 to less than 0.5% by weight, of one or more polysiloxane macromonomers $a_1$, $e_2$) 10 to 50% by weight, preferably 15 to 35% by weight, of one or more ethylenically unsaturated monomers containing epoxide groups, $e_3$) 0 to 40% by weight, preferably 0 to 30% by weight, of one or more vinylaromatic hydrocarbons, $e_4$) 0 to 30% by weight, preferably 0 to 20% by weight, of one or more monomers having at least two polymerizable, ethylenically unsaturated double bonds and $e_5$) 0 to 89.95% by weight of one or more ethylenically unsaturated copolymerizable monomers, the sum of the parts by weight of components $e_1$ to $e_3$ being in each case 100% by weight.

Examples of suitable monomers are the compounds already mentioned in the description of copolymer (A). Copolymers (A) and (B) are obtainable by solution polymerization of the monomers. The polymerization is preferably carried out with exclusion of oxygen, for example by working in a nitrogen atmosphere. The reactor is equipped with corresponding stirring, heating and cooling devices and with a reflux condenser, in which volatile constituents, such as, for example, styrene, are retained. The polymerization reaction is preferably carried out at temperatures of 90° to 160° C., particularly preferably 110° to 140° C., using polymerization initiators and if appropriate polymerization regulators.

Suitable free radical initiators are organic peroxides, such as, for example, dibenzoyl peroxide, dicumyl peroxide, cumene hydroperoxide, di-tert-butyl peroxide, tert-butylamide peroxide, tert-butyl hydroperoxide, 2,2-di-tert-butyl peroxybutane, tert-amyl perbenzoate, 1,3-bis(tert-butyl peroxyisopropyl)-benzene, diisopropylbenzene monohydroperoxide and diacyl peroxides, such as, for example, diacetyl peroxide, peroxyketals, such as, for example, 2,2-di-(tert-amylperoxy)-propane and ethyl 3,3-di-(tert-amylperoxy)-butyrate, and heat-labile highly substituted ethane derivatives, for example those based on silyl-substituted ethane derivatives and based on benzopinacol. Aliphatic azo compounds, such as, for example, azobiscyclohexanenitrile, furthermore can also be employed.

The amount of initiator in most cases is 0.1 to 5% by weight, based on the amount of monomer to be processed, but it can also be higher, if appropriate. Usually, the initiator, dissolved in some of the solvent employed for the polymerization, is metered in gradually during the polymerization reaction. The initiator addition preferably takes about 1 to 2 hours longer than the monomer addition, so that a good action is thus also achieved during the after-polymerization phase. If initiators with only a slow rate of dissociation, that is to say a long half-life, under the reaction conditions which exist are employed, it is also possible for the initiator to be initially introduced.

The reaction is preferably carried out in the presence of polymerization regulators, since clouding of the polymer solutions can be avoided better in this way. Suitable regulators are, preferably, mercapto compounds, mercaptoethanol particularly preferably being employed. Other possible regulators are, for example, alkylmercaptans, such as, for example, t-dodecylmercaptan, octylmercaptan, phenylmercaptan, octyldecylmercaptan and butylmercaptan, and thiocarboxylic acids, such as, for example, thioacetic acid or thiolactic acid.

These regulators are employed in an amount of up to 2% by weight, based on the amount of monomer to be processed. They are preferably dissolved in one of the monomer additions and added with the monomers. The amount of regulator added is preferably constant with respect to time.

The polymerization is carried out in an organic solvent which is inert toward the monomer employed and if appropriate toward carboxylic acid anhydrides. The polymerization solids content is preferably at least 50% by weight, particularly preferably between 60 and 75% by weight, based on the total weight of the reaction mixture. Examples of suitable solvents are commercially available alkylated aromatic hydrocarbons or mixtures having a boiling range of 150° to 220° C., xylene and other aromatic hydrocarbons, esters, such as, for example, butyl acetate, butylglycol acetate, ethyl ethoxypropionate and the like, and aliphatic hydrocarbons and the like.

The copolymerization of the monomer components is preferably carried out as follows:

At least 10% by weight, preferably 100% by weight, of the total amount of component $a_1$ to be employed is initially introduced into the reactor together with some of the total amount of solvent to be employed, and the mixture is heated up to the particular reaction temperature. The remaining amount of solvent is preferably added—as already described—gradually together with the catalyst. Any remaining amount of component $a_1$ which still exists and the other monomers (components $a_2$ to $a_6$) are metered in.

If vinyl ester monomers are employed for the preparation of the acrylate copolymer (A) or (B), preferably at least 60% by weight, particularly preferably 100% by weight, of the total amount of the vinyl ester is also added in the initial mixture.

This specific polymerization process promotes, as is assumed, copolymerization and reduces homopolymerization of the individual components. In addition, copolymers which have a very low residual monomer content and give clear solutions having a high solids content are obtained.

The copolymers (A) employed according to the invention preferably have a number-average molecular weight of 5000 to 25000.

The acrylate copolymer (A) containing carboxyl groups usually has an acid number of 40 to 150 mg of KOH/g, preferably of 60 to 120 mg of KOH/g. Copolymer (A) furthermore can also contain carboxyl groups and/or tertiary amino groups. Preferred acrylate copolymers (A) have an amine number of 0 to 100 mg of KOH/g, preferably of 10 to 70 mg of KOH/g, and an OH number of 0 to 110 mg of KOH/g, preferably of 20 to 90 mg of KOH/g.

The carboxyl groups required for hardening the coating agents can be introduced at least in part using monomers containing carboxyl groups when building up the acrylate copolymers (A). However, it is also possible for at least some of the carboxyl groups of the copolymer to be introduced by addition of carboxylic acid anhydrides onto copolymers containing hydroxyl groups.

The copolymers employed for the reaction with the carboxylic acid anhydrides here usually have an OH number of 40 to 250 mg of KOH/g, preferably of 80 to 140 mg of KOH/g.

Carboxylic acid anhydrides which are suitable for addition onto the copolymers containing hydroxyl groups are the anhydrides of aliphatic, cycloaliphatic and aromatic saturated and/or unsaturated di- and polycarboxylic acids, such as, for example, the anhydrides of phthalic acid, tetrahydrophthalic acid, hexahydrophthalic acid, succinic acid, maleic acid, itaconic acid, glutaric acid, trimellitic acid and pyromellitic acid, and halogenated or alkylated derivatives thereof.

Anhydrides of phthalic acid and tetrahydro- and hexahydrophthalic acid and 5-methylhexahydrophthalic anhydride are preferably employed.

The reaction of the copolymers containing hydroxyl groups with the carboxylic acid anhydrides is carried out at temperatures of 100° to 140° C. in the presence of a catalyst, such as, for example, tertiary amines.

On the other hand, if the copolymers containing hydroxyl groups contain tertiary amino groups - for example by using monomers having tertiary amino groups or by prior reaction of the copolymers containing hydroxyl groups with compounds V, which contain on average 0.8 to 1.5, preferably 1, free isocyanate groups and at least one tertiary amino group per molecule—a catalyst can be dispensed with and the reaction can be carried out at low temperatures of 50° to 130° C.

It is particularly advantageous if tertiary amino groups are incorporated into the copolymer containing carboxyl groups, since they catalyze subsequent crosslinking of the copolymers containing carboxyl groups with epoxide groups and the baking temperatures of coating agents based on these polymers are thus reduced.

If the copolymer contains tertiary amino groups, it must be ensured in the case of addition of unsaturated carboxylic acid anhydrides, such as, for example, in the case of addition of maleic anhydride, that no solvents which react with the unsaturated carboxylic acid anhydride under catalysis by the tertiary nitrogen groups are employed. Thus, for example, acetone, methyl ethyl ketone, butyl acetate and other acetylating solvents cannot be used. Hydrocarbons and polar solvents, such as dimethylformamide, dimethylacetamide, n-methylpyrrolidone [sic] and the like can be used.

The tertiary amino groups are preferably introduced by reacting the polymer containing hydroxyl and carboxyl groups with compounds V which contain on average 0.8 to 1.5, preferably 1, free isocyanate groups and at least one tertiary amino group per molecule. However, it is also possible for the copolymer containing hydroxyl groups first to be reacted with the compounds V and only then for the carboxyl groups to be introduced into the copolymer by reaction with a carboxylic acid anhydride. In this case—as already mentioned—the reaction with the anhydride can be carried out at low temperatures.

The amount of compound V is chosen here so that the resin formed has an amine number of up to 100 mg of KOH/g. If the copolymers are to be employed in coating agents which are hardened at room temperature, a higher amine number of 10 to 70 mg of KOH/g is established.

The compounds V used to introduce the tertiary amino groups are prepared by reacting diisocyanates or polyisocyanates with a stoichiometric deficit of a tertiary amine. Tertiary amines which are suitable for this reaction are those of the general formula $NR_1R_2R_3$, wherein $R_1$ preferably denotes an alkanol radical or another radical containing hydroxyl groups and $R_2$ and $R_3$ can be alkyl or cycloalkyl radicals. Dialkylalkanolamines, such as, for example, dimethylethanolamine, diethylethanolamine and higher homologues or isomers thereof, are preferred.

Examples of suitable di- or polyisocyanates are: Aromatic isocyanates, such as, for example, toluylene 2,4- and 2,6- diisocyanate and mixtures thereof, diphenylmethane 4,4'-diisocyanate, m-phenylene diisocyanate, p-phenylene diisocyanate, diphenylene 4,4'-diisocyanate, naphthalene 1,5-diisocyanate, naphthalene 1,4-diisocyanate, toluidine 4,4'-diisocyanate, xylylene diisocyanate and substituted aromatic systems, such as, for example, dianisidine diisocyanates, diphenyl ether 4,4'-diisocyanates and chlorodiphenylene diisocyanates, and aromatic isocyanates of higher functionality, such as, for example, 1,3,5-triisocyanatobenzene, 4,4',4"-triisocyanatotriphenylmethane [sic], 2,4,6-triisocyanatotoluene and 4,4'-diphenyldimethane 2,2',5,5'-tetraisocyanate; cycloaliphatic isocyanates, such as, for example, cyclopentane 1,3-diisocyanate, cyclohexane 1,4-diisocyanate, cyclohexane 1,2-diisocyanate and isophorone diisocyanate; and aliphatic isocyanates, such as, for example, trimethylene, tetramethylene, pentamethylene, hexamethylene and trimethylhexamethylene 1,6-diisocyanate and trishexamethylene triisocyanate.

Diisocyanates having isocyanate groups of different reactivity, such as, for example, isophorone diisocyanate, are preferably employed.

The reaction between the amine and the isocyanate is carried out at temperatures from 0° to 80° C., preferably from 20° to 50° C. The proportions of the reaction partners are chosen so that the compound V formed contains 0.8 to 1.5, preferably 1, free isocyanate groups.

In addition to or instead of the acrylate copolymers (A) containing carboxyl groups, the coating agents according to the invention can also comprise, if appropriate, further addition and/or condensation resins containing carboxyl groups. All the resins usually employed in coating agents are suitable for this purpose. The choice of these resins depends largely on the desired properties of the coating agents in respect of elasticity, hardness, compatibility, polarity and the like. Resins having an acid number of 10 to 160 mg of KOH/g, particularly preferably 20 to 120 mg of KOH/g, are preferably employed as component C. If appropriate, the resins C additionally can also contain tertiary amino groups and/or hydroxyl groups. The resins C preferably have amine numbers of 0 to 90 mg of KOH/g and/or OH numbers of 0 to 250 mg of KOH/g.

A mixture of 10 to 95% by weight, preferably 40 to 90% by weight, of component (A) and 90 to 5% by weight, preferably 10 to 60% by weight, of at least one polyester (component C) which contains carboxyl and amino groups and has an acid number of 10 to 160, preferably 20 to 120 mg of KOH/g, and an amine number of 0 to 90, preferably 10 to 60 mg of KOH/g, is particularly preferably employed as the binding agent in the coating agents according to the invention. The sum of the amounts by weight of components (A) plus (C) here is in each case 100% by weight. For low contents of component (A), copolymers having a relatively high content of $a_1$ are employed as component (A).

The polyester is obtainable by reaction of

P1) polycarboxylic acids or anhydrides thereof, if appropriate together with monocarboxylic acids, P2) polyols, if appropriate together with monools, and if appropriate P3) further modifying components, and if appropriate P4) a component which can react with the reaction product of P1, P2 and if appropriate P3, with the proviso that the end product contains tertiary amino groups which originate from component P1 and/or P2 and/or P4.

Suitable polycarboxylic acids (component P1) for the preparation of the polyesters are, for example, phthalic acid, isophthalic acid, terephthalic acid, halogenophthalic acids, such as tetrachloro- and tetrabromophthalic acid, hexahydrophthalic acid, adipic acid, sebacic acid, fumaric acid, maleic acid, endomethylene-tetrahydrophthalic acid, 1,1,3-trimethyl-3-phenylindane-4,5-dicarboxylic acid, trimellitic acid and anhydrides of the acids mentioned, where these exist.

To prepare polyesters having the lowest possible color number, the use of aliphatic and cycloaliphatic polycarboxylic acids or of anhydrides thereof which are not prepared by the Oxo process is preferred. The use of cyclohexanedicarboxylic acid is particularly preferred, since it leads to colorless polymers which furthermore at the same time lead to a good drying and development of hardness in the paint film. If appropriate, monocarboxylic acids, such as, for example, benzoic acid, tertbutylbenzoic acid, lauric acid, isononanoic acid and fatty acids of naturally occurring oils, can also be employed together with the polycarboxylic acids.

In a preferred embodiment, aminocarboxylic acids having at least one tertiary amino group can be used, inter alia or exclusively, as component P1 (carboxylic acid component). Examples of these are: pyridine-2-carboxylic acid, pyridine-3-carboxylic acid, pyridine-4-carboxylic acid and pyridine-2,6-dicarboxylic acid. Nicotinic acid, that is to say pyridine-3-carboxylic acid, is preferably used here because it is a very reactive aminocarboxylic acid in respect of catalyzing the acid/epoxide reaction.

The reaction product of anaminoalcohol having at least one tertiary amino group and a polycarboxylic acid anhydride can also be used advantageously as component P1. The reaction product of 2-hydroxyethyl-piperidine with phthalic anhydride may be mentioned as an example here.

The reaction product of a polyamine having at least one tertiary and at least one primary or secondary, preferably secondary, amino group and a polycarboxylic acid anhydride furthermore can be used as component P1.

Suitable alcohol components P2 for the preparation of the polyester are polyhydric alcohols, such as ethylene [sic] glycol, propanediols, butanediols, pentanediols, hexanediols, neopentylglycol, diethylene glycol, cyclohexanedimethanol, trimethylpentanediol, ditrimethylolpropane [sic], trimethylolethane, trimethylolpropane, glycerol, pentaerythritol, dipentaerythritol, trishydroxyethyl isocyanurate, polyethylene glycol and polypropylene glycol, if appropriate together with monohydric alcohols, such as, for example, butanol, octanol, lauryl alcohol and ethoxylated or propoxylated phenols.

Aminoalcohols having at least one tertiary amino group preferably can be used, inter alia or exclusively, as the alcohol component P2. Examples of these which may be mentioned are 2-hydroxyethylpyridine, dimethylaminopropanol, methyldiethanolamine, methyldipropanolamine and dihydroxyethylaniline. Reaction products of epoxy resins with carboxylic acids and/or amines likewise are preferably employed as the alcohol component P2.

The reaction product of low molecular weight epoxy resins with polycarboxylic acids and/or polycarboxylic acid anhydrides and aminocarboxylic acids having at least one tertiary amino group and/or polyamines having at least one tertiary and at least one primary or secondary amino group, the product subsequently also being esterified, if appropriate, with the acid and the alcohol component and being modified, if appropriate, with polyisocyanates, can thus be used as the alcohol component P2. Low molecular weight epoxy resins are to be understood as epoxy resins having a molecular weight of less than about 2000.

If epoxy resins are used, low-chlorine types should be employed, since otherwise severe discoloration of the products may occur.

Polyisocyanates and/or diepoxide compounds, and if appropriate also monoisocyanates and/or monoepoxide compounds, are preferably used as the modified [sic] component P3. Suitable polyisocyanates are, for example, the toluylene diisocyanates, hexamethylene diisocyanate and isophorone diisocyanate. Diepoxide compounds are to be understood as epoxy resins having on average about two epoxide groups per molecule. Suitable monoepoxide compounds are, for example, olefin oxides, such as octylene oxide, butyl glycidyl ether, allyl glycidyl ether, phenyl glycidyl ether, p-butylphenol glycidyl ether, cresyl glycidyl ether, styryl oxide, glycidyl methacrylate, cyclohexenevinyl monoxide, dipentene monoxide, α-pinene oxide and glycidyl esters of tertiary carboxylic acids.

Monoisocyanates having at least one tertiary amino group are preferably used as components P4 which can react with the reaction product of P1, P2 and if appropriate P3. These monoisocyanates can be prepared, for example, by reaction of suitable diisocyanates, such as isophorone diisocyanate, with aminoalcohols having a tertiary amino group, such as, for example, hydroryethylpyridine or dimethylaminoethanol, or with polyamines having at least one tertiary and at least one secondary or primary amino group. The monoisocyanates are bonded to the binding agent system by reaction with free hydroxyl groups of the polycondensation and/or addition product to form a urethane bond.

Polyamines having at least one tertiary and at least one primary or secondary amino group can also be used as component P4. An example which may be mentioned here is dimethylaminopropylmethylamine.

The ring-opening product of epoxy resins with compounds having an active hydrogen can also be used as the alcohol component. Thus, for example, first diepoxides, such as the known Epikote types, can be reacted first in stages with dicarboxylic acids, such as, for example, pyridine-2,6-dicarboxylic acid, to give a precursor, which is then further employed as the alcohol component.

Further components P1 to P2 [sic] which are suitable for building up the polyester resin can be found in German Patent Application 36 29 470.

It is important in all cases that the resulting end product has an acid number in the range from 10 to 160, preferably from 20 to 120, and an amine number in the range from 0 to 90, preferably 10 to 60. Too severe a discoloration of the products during the condensation is avoided by addition of antioxidants or reducing agents, such as, for example, hypophosphorous acid.

The polyesters and acrylates containing carboxyl and tertiary amino groups are prepared from the compounds mentioned in the customary manner.

For all two-stage variants in which a cyclic acid anhydride is added onto a polymer containing hydroxyl groups, it is preferable for the initial dissolving of the resin after the addition to be carried out not with primary but with secondary or tertiary alcohols, in order thus to suppress the alcoholysis of the half-ester bond which proceeds as a side reaction.

The coating agent according to the invention comprises at least one epoxy resin having on average more than one epoxide group per molecule as the crosslinking agent for the reaction with the carboxyl groups of copolymer (A) and/or of resin (C). The amounts of binding agent and hardener employed are usually chosen so that the ratio of acid groups of the binding agent (component (A) and/or component (C)) to the epoxide groups of the hardener (component (B) and/or (D)) is in the range from 0.3:1 to 3:1.

The total amount of binding agent plus hardener employed (without the solvent content) is usually between 30 and 70% by weight, based on the total weight of the coating agent.

Component (B) and/or (D) are employed as the crosslinking agent component. Particularly preferred coating agents comprise, in addition to the acrylate copolymers (A) containing carboxyl groups and if appropriate further resins (C) containing carboxyl groups, the epoxy resins (D) as the crosslinking agent.

The acrylate copolymers (B) which contain epoxide groups and are suitable as the crosslinking agent have already been described in pages 26 to 27 of the present description.

The copolymers (B) employed according to the invention preferably have a number-average molecular weight of 800 to 2200. The epoxide equivalent weight of the copolymers (B) is preferably between 250 and 550.

Examples of the epoxy resins employed as component (D) are compounds having at least two epoxide groups per molecule, for example condensation products of epichlorohydrin and bisphenol A, and the cycloaliphatic bisepoxides which correspond to the formulae (I) and (II):

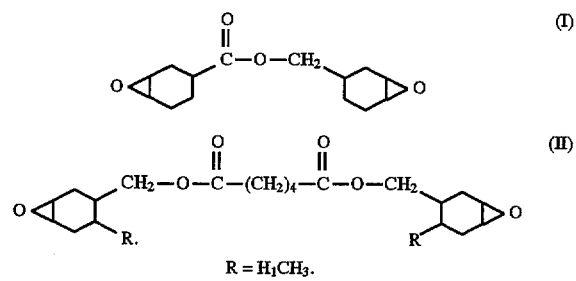

$R = H_1CH_3$.

Substances which furthermore are suitable as component (D) are, for example, epoxidation products of naturally occurring fats, oils, fatty acid derivatives, modified oils and epoxidized polybutadienes, which are formed by reaction of commercially available polybutadiene oils with peracids or organic acid/$H_2O_2$ mixtures, novolaks containing epoxide groups, glycidyl ethers of a polyhydric alcohol, for example ethylene glycol diglycidyl ether, glycerol polyglycidyl ether, sorbitol polyglycidyl ether, trimethylolpropane polyglycidyl ether and pentaerythritol polyglycidyl ether, and low molecular weight acrylate resins having oxirane groups in side chains.

Substances which furthermore can also advantageously be employed as the crosslinking agent (D) are reaction products of polyepoxides containing hydroxyl groups with di- or polyisocyanates, such as are formed, for example, by reaction of OH-functional epoxides, such as, for example, before [sic] sorbitol polyglycidyl ethers, with isophorone diisocyanate.

Polar epoxides, for example based on a reaction product of melamine resins with acrylamide, the acrylic double bond subsequently being epoxidized, are also employed as preferred crosslinking agents (D). An example of this substance class which may be mentioned is the commercial product Santolink LSE 4103 from Monsanto, in which the epoxy resin base structure is a dinuclear melamine, the molecular weight is about 1200 and the epoxide equivalent weight is about 300.

If appropriate, a crosslinking catalyst can be used to catalyze the carboxy/epoxy reaction. Catalysts which are particularly suitable here are tertiary amines, quaternary ammonium compounds, such as, for example, benzyltrimethylammonium chloride, specific chromium compounds and tin compounds. The use of a crosslinking catalyst is of course unnecessary in most cases where tertiary amino groups are already incorporated into the acrylate copolymer. Lower baking temperatures and shorter baking times are achieved by using an internal or external crosslinking catalyst. The crosslinking catalyst is preferably used in an amount of 0.5 to 10% by weight, based on the weight of the epoxide component.

Solvents which are suitable for the coating agents according to the invention are, for example, toluene, xylene, butanol, ethyl acetate, butyl acetate, pentyl acetate, dimethyl glutarate, dimethyl succinate, 1-methoxyprop-2-yl acetate, 2-ethylhexanol, ethylene glycol diacetate, ethylene glycol monoethyl and -butyl ether or acetates thereof, ethylene glycol dimethyl ether, diethylene glycol dimethyl ether, gasolines containing aromatics, cyclohexanone, methyl ethyl ketone, acetone, butyl acetoxyglycolate and ethyl acetoxyglycolate.

These solvents can be employed individually or as a mixture of various solvents.

The coating agents according to the invention moreover can contain, if appropriate, pigments as well as auxiliaries and additives. Suitable additives and auxiliaries are, for example, fillers, such as, for example, talc, mica, kaolin, chalk, quartz flour, asbestos flour, barium sulfate, silicates and glass fibers, and antisettling agents, such as, for example, finely divided silicic acid, bentonite, colloidal silicates and the like; flow agents, silicone oils, plasticizers, such as phosphoric acid esters and phthalic acid esters, viscosity-controlling additives, matting agents, UV absorbers and light stabilizers.

The pigments and fillers are usually employed in an amount of 0 to 60% by weight, based on the total weight of the coating agent. The amount of auxiliaries and additives employed is usually 0.2 to 10% by weight, based on the total weight of the coating agent. The solvent content of the coating agent is usually from 30 to 70% by weight, based on the total weight of the coating agent. The content of binding agent plus hardener is in general 30 to 70% by weight, based on the total weight of the coating agent.

The coating agents according to the invention are prepared in a known manner by mixing and if appropriate dispersing the individual constituents.

The coating agents according to the invention are preferably prepared by a process which is characterized in that the acrylate copolymer (A) and/or (B) is prepared by solution polymerization at temperatures between 90° and 160° C., preferably between 110° and 140° C., by 1.) initially introducing at least 10% by weight of the total amount of the polysiloxane macromonomer $a_1$ into the reaction vessel and
2.) metering in the other monomers and any remainder of the polysiloxane macromonomer $a_1$ which still exists.

The coating agents according to the invention can be applied in the form of a film to a substrate by spraying, flooding, dipping, rolling, knife-coating or brushing, the film then being hardened to give a firmly adhering coating.

The coating agents according to the invention are suitable—if low hardening temperatures of between about 10° C. and 130° C., preferably ≦80° C., can be used (see above)—by appropriate choice of the hardener component—for repair painting of motor vehicles and in particular for use as a top coat and clear coat, but also as a primer and filler material. They are also particularly suitable as a clear coat over a base coat of a metallic multicoat paint.

The invention will be illustrated in more detail in the following examples. All the data on parts and percentages are weight data, unless expressly stated otherwise.

1. Preparation of Various Acryate Copolymers (A) Containing Carboxyl Groups

The acrylate copolymers (A) were in each case prepared in a 4 liter high-grade steel polymerization kettle with a stirrer, reflux condenser, two monomer feeds and an initiator feed. The particular components stated are weighed out and the initial mixture is then heated up to 110° C.

All the feeds are started simultaneously, the two monomer feeds being metered in uniformly in the course of 3 hours and the initiator feed being metered in over a period of 4 hours. During the polymerization, the temperature in the kettle is kept at 108°–110° C. Thereafter, the mixture is subjected to after-polymerization for a further 2 hours. The acrylate resin solution thus obtained has a solids content of 50%.

The corresponding parts of hexahydrophthalic anhydride (HHPA) are then added (see Table), and the addition reaction on the acrylate resin is carried out at 110° C. When the acid number determination in aqueous and alcoholic KOH gives the same values, the mixture is diluted to a solids content of 50% with sec-butanol.

The commercial product Marubeni® AK 5 from Toagosei Chemical Industries Co., LTD. was used as the siloxane macromonomer. It has a number-average molecular weight of about 5000 and on average one ethylenically unsaturated double bond per molecule.

TABLE

| Example | A1 | A2 | A3 | A4 | A5 | A6 | A7 | A8 |
|---|---|---|---|---|---|---|---|---|
| Content (parts) HHPA | 309.8 | 178.8 | 310.3 | 310.2 | 324.7 | 315.5 | 313.8 | 104.6 |

1.1. Preparation of an acrylate copolymer (A₁) [sic]

Initial mixture:

13 parts of siloxane macromonomer (Marubeni® AK5)
552.2 parts of butyl acetate
552.2 parts of xylene Monomer feed A:

130 parts of dimethylaminoethyl methacrylate
130 parts of ethylhexyl acrylate
195 parts of hydroxybutyl acrylate
312 parts of n-butyl acrylate Monomer feed B:

208 parts of hexanediol dimethacrylate
195 parts of hydroxyethyl methacrylate
130 parts of styrene
6.5 parts of mercaptoethanol
0.7 parts of triisodecyl phosphite Initiator feed:

65 parts of 2,2'-azobis(2-methylbutanenitrile)
130 parts of butyl acetate
130 parts of xylene Viscosity (original): >40 dPa s (23° C.)
Acid number (aqueous/alcoholic): 67.5/71.1 mg of KOH/g

1.2 Preparation of an acrylate copolymer (A2)

Initial mixture:

22.7 parts of siloxane macromonomer (Marubeni® AK5)
596.1 parts of butyl acetate
596.1 parts of xylene TABLE-continued Monomer feed A:

195 parts of hydroxybutyl acrylate
173.3 parts of ethylhexyl acrylate
355.3 parts of n-butyl acrylate Monomer feed B:

208 parts of hexanediol dimethacrylate
173.3 parts of cyclohexyl methacrylate
185.9 parts of hydroxyethyl methacrylate
6.5 parts of mercaptoethanol
0.65 parts of triisodecyl phosphite Initiator feed:

33.8 parts of 2,2'-azobis(2-methylbutanenitrile)
67.6 parts of butyl acetate
67.6 parts of xylene Viscosity (original): 3.0 dPa s (23° C.)
Acid number (aqueous/alcoholic): 75.5/80.4 mg of KOH/g

1.3 Preparation of an acrylate copolymer (A3)

Initial mixture:

596.1 parts of butyl acetate
596.1 parts of xylene

Monomer feed A:

65 parts of dimethylaminoethyl methacrylate
195 parts of hydroxybutyl acrylate
162.5 parts of ethylhexyl acrylate
312 parts of n-butyl acrylate Monomer feed B:

208 parts of hexanediol dimethacrylate
162.5 parts of cyclohexyl methacrylate
185.9 parts of hydroxyethyl methacrylate
22.8 parts of siloxane macromonomer (Marubeni ® AK5)
6.5 parts of mercaptoethanol
0.7 parts of triisodecyl phosphite Initiator feed:

33.8 parts of 2,2'-azobis(2-methylbutanenitrile)
67.6 parts of butyl acetate
67.6 parts of xylene Viscosity (original): 11.0 dPa s (23° C.)
Acid number (aqueous/alcoholic): 74.7/71.2 mg of KOH/g

1.4 Preparation of an acrylate copolymer (A4)

Initial mixture:

596.1 parts of butyl acetate
596.1 parts of xylene

Monomer feed A:

195 parts of hydroxybutyl acrylate
173.3 parts of ethylhexyl acrylate
355.3 parts of n-butyl acrylate Monomer feed B:

208 parts of hexanediol dimethacrylate
173.3 parts of cyclohexyl methacrylate
185.9 parts of hydroxyethyl methacrylate
22.7 parts of slioxane macromonomer (Marubeni ® AK5)
6.5 parts of mercaptoethanol
0.65 parts of trlisodecyl phosphite Initiator feed:

33.8 parts of 2,2'-azobis(2-methylbutanenitrile)
67.6 parts of butyl acetate
67.6 parts of xylene Viscosity (original): 2.4 dPa s (23° C.)
Acid number (aqueous/alcoholic): 72.4/70.9 mg of KOH/g

1.5 Preparation of an acrylate copolymer (A5)

Initial mixture:

32.5 parts of siloxane macromonomer (Marubeni ® AK5)
546.9 parts of butyl acetate
546.9 parts of xylene TABLE-continued Monomer feed A:

130 parts of dimethylaminoethyl methacrylate
195 parts of hydroxybutyl acrylate
305.5 parts of n-butyl acrylate
130 parts of ethylhexyl acrylate Monomer feed B:

208 parts of hexanediol dimethacrylate
195 parts of hydroxyethyl methacrylate
123.5 styrene
6.5 parts of mercaptoethanol
0.7 parts of triisodecyl phosphite Initiator feed:

65 parts of 2,2'-azobis(2-methylbutanenitrile)
130 parts of butyl acetate
130 parts of xylene Viscosity (original): thixotropic
Acid number (aqueous/alcoholic): 76.8/78.1 mg of KOH/g

1.6 Preparation of an acrylate copolymer (A6)

Initial mixture:

81.3 parts of siloxane macromonomer (Marubeni ® AK5)
531.9 parts of butyl acetate
531.9 parts of xylene Monomer feed A:

130 parts of dimethylaminoethyl methacrylate
195 parts of hydroxybutyl acrylate
295.8 n-butyl acrylate
130 ethylhexyl acrylate Monomer feed B:

208 parts of hexanediol dimethacrylate
195 parts of hydroxyethyl methacrylate
113.5 parts of styrene
6.5 parts of mercaptoethanol
0.7 parts of triisodecyl phosphite Initiator feed:

65 parts of 2,2'-azobis(2-methylbutanenitrile)
130 parts of butyl acetate
130 parts of xylene Viscosity (original): >40 dPa s
Acid number (aqueous/alcoholic): 79.1/78.7 mg of KOH/g

1.7 Preparation of an acrylate copolymer (A7) (Comparison)

Initial mixture:

162.5 parts of siloxane macromonomer (Marubeni ® AK5)
503.5 parts of butyl acetate
503.5 parts of xylene Monomer feed A:

130 parts of dimethylaminoethyl methacrylate
195 parts of hydroxybutyl acrylate
279.5 parts of n-butyl acrylate
130 parts of ethylhexyl acrylate Monomer feed B:

208 parts of hexanediol dimethacrylate
195 parts of hydroxyethyl methacrylate
97.5 parts of styrene
6.5 parts of mercaptoethanol
0.7 parts of triisodecyl phosphite Initiator feed:

65 parts of 2,2'-azobis (2-methylbutanenitrile)
130 parts of butyl acetate
130 parts of xylene viscosity (original): >40 dPa s (23° C.)
Acid number (aqueous/alcoholic): 70.2/69.9 mg of KOH/g

1.8 Preparation of an acrylate copolymer (A8)

TABLE-continued

(Comparison)

Initial mixture:

231.9 parts of butyl acetate
231.9 parts of xylene

Monomer feed A:

50 parts of dimethylaminoethyl methacrylate
75 parts of hydroxybutyl acrylate
120 parts of n-butyl acrylate
50 parts of ethylhexyl acrylate

Monomer feed B:

80 parts of hexanediol dimethacrylate
75 parts of hydroxyethyl methacrylate
50 parts of styrene
2.5 parts of mercaptoethanol
0.25 parts of triisodecyl phosphite

Initiator feed:

13 parts of 2,2'-azobis(2-methylbutanenitrile)
26 parts of butyl acetate
26 parts of xylene
Viscosity (original): >26 dPa s (23° C.)
Acid number (aqueous/alcoholic): 75/77 mg of KOH/g

2. Preparation of a Polyester Resin 488 parts of hexahydrophthalic anhydride, parts of 1,4-cyclohexanedicarboxylic acid, 752 parts of trimethylolpropane, 72.5 parts of neopentyl glycol, 82.8 parts of methyldiethanolamine, 200 parts of isononanoic acid, 77 parts of benzoic acid, 88 parts of xylene and 1.14 parts of triisodecyl phosphite are introduced into a 4 liter polycondensation kettle with a stirrer, steam-heated column and water separator and are slowly heated up. The condensation reaction is carried out at a temperature of not more than 190° C. to an acid number of 20 mg of KOH/g and a viscosity of 2.0 dPas (50% strength in butyl glycol), and the mixture is then cooled and partly dissolved with 886 parts of xylene at 130° C. After further cooling to 50° C., 321.3 parts of hexahydrophthalic anhydride and 1.12 parts of triisodecyl phosphite are now added to this solution. The addition reaction of the anhydride is carried out at not more than 50° C. until an acid number of 68 mg of KOH/g and a viscosity of 2.4 dPas (50% strength in butyl glycol) are reached. The mixture is then partly dissolved with 377 parts of xylene and 147 parts of sec-butanol.

The polyester thus obtained has a solids content of 61.5%, an acid number of 68 mg of KOH/g and a viscosity of 13.5 dPas (original).

Preparation of a Hardener Solution 1

63.8 parts of a commercially available aliphatic epoxy resin which has a molecular weight of about 1200 and an epoxide equivalent weight of about 250–550 and is based on a dinuclear melamine resin, reacted with acrylamide with subsequent epoxidization of the acrylic double bonds (commercial product Monsanto LSE 4114 from Monsanto), and 36.2 parts of methoxypropanol are mixed.

Preparation of a Paint Thinner 1

50 parts of methoxypropanol, 25 parts of 1-methoxyprop-2-yl acetate and 25 parts of n-butanol are mixed.

EXAMPLES 1 to 6

53 parts of copolymer solutions A1 or A2 or A3 or A4 or A5 or A6, 27 parts of polyester resin 1, 1 part of a commercially available light stabilizer based on benzotriazole (commercial product Tinuvin® 900 from Ciba Geigy), 1 part of a commercially available light stabilizer based on a sterically hindered amine (commercial product Tinuvin® 440 from Ciba Geigy) and 18 parts of methoxypropanol are stirred successively using a dissolver.

Shortly before application of the clear paint, 50 parts of hardener solution 1 and 30 parts of paint thinner 1 are admixed. The composition of the clear paints is summarized in Table 2. The paint mixtures prepared in this way are applied as a clear paint with a dry film coating thickness of 50±10 µm by the wet-in-wet process onto a commercially available conventional silver metallic base coat (based on polyester resin, melamine resin and cellulose acetobutyrate, commercial product AE 54 from BASF Lacke+Farben AG; dry film coating thickness 20±5 µm).

The coatings thus obtained are tested for drying immediately (dry to touch). For the further tests, all the sheets were first dried at room temperature for 1 hour and at 60° C. for 30 minutes. After further drying at room temperature for 24 hours, the pendulum hardness according to König was determined, the resistance to gasoline was determined with the aid of the gas spill test and the adhesion was determined with the aid of the taping test. After storage at room temperature for 7 days, the elasticity was determined by means of the cupping index, the resistance to weathering was determined with the aid of the Volvo test, and the scratch resistance of the resulting coatings was determined. The tests shown in Table 3 were furthermore carried out.

COMPARISON EXAMPLES 1 to 3

The clear paints of Comparison Examples 1 to 3 were prepared, applied, cured and tested analogously to Examples 1 to 6. The clear paint of Comparison Example 1 differs from that of Examples 1 to 6 merely in that, instead of a copolymer (A) according to the invention, a copolymer (A7) which contains siloxane groups and has too high a content of polysiloxane macromonomer $a_1$ was employed.

The clear paint of Comparison Example 2 differs from that of Examples 1 to 6 in that, instead of a copolymer (A) according to the invention, a copolymer (AS) which is free from siloxane groups has now been employed. The addition of 0.01%, based on the total weight of the clear paint, including hardener solution 1 and thinner 1, of a fluorosurfactant as a flow agent furthermore is necessary.

The clear paint of Comparison Example 3 differs from that of Examples 1 to 6 in that, instead of a copolymer (A) according to the invention, a copolymer (AS) which is free from siloxane groups has now been employed. 0.1%, based on the total weight of the clear paint, of a commercially available silicone additive (commercial product Tegoglide® 410 from Tegochemie Essen) furthermore was added to the clear paint.

The composition of the clear paints is shown in Table 2. The test results on the coatings are summarized in Table 4.

TABLE 1

Composition (in % by weight) and parameters of copolymers A1 to A8

| | A1 | A2 | A3 | A4 | A5 | A6 | A7 | A8 |
|---|---|---|---|---|---|---|---|---|
| Dimethyl-aminoethyl methacrylate | 10.0 | — | 5.0 | — | 10.0 | 10.0 | 10.0 | 10.0 |
| Ethylhexyl | 10.0 | 13.3 | 12.5 | 13.3 | 10.0 | 10.0 | 10.0 | 10.0 |

TABLE 1-continued

Composition (in % by weight) and parameters of copolymers A1 to A8

|  | A1 | A2 | A3 | A4 | A5 | A6 | A7 | A8 |
|---|---|---|---|---|---|---|---|---|
| acrylate |  |  |  |  |  |  |  |  |
| Hydroxybutyl acrylate | 14.9 | 15.0 | 15.0 | 15.0 | 15.0 | 15.0 | 15.0 | 15.0 |
| n-Butyl acrylate | 23.9 | 27.4 | 24.0 | 27.4 | 23.5 | 22.75 | 21.5 | 24.0 |
| Hexanediol dimethacrylate | 15.9 | 16.0 | 16.0 | 16.0 | 16.0 | 16.0 | 16.0 | 16.0 |
| Hydroxyethyl methacrylate | 14.9 | 14.3 | 14.3 | 14.3 | 15.0 | 15.0 | 15.0 | 15.0 |
| Styrene | 10.0 | — | — | — | 9.5 | 8.75 | 7.5 | 10.0 |
| Cyclohexyl methacrylate | — | 13.3 | 12.5 | 13.3 | — | — | — | — |
| Siloxane macromonomer | 0.4 | 0.7 | 0.7 | 0.7 | 1.0 | 2.5 | 5 | — |
| OH number (intermediate product) (mg of KOH/g) | 115.3 | 114.2 | 115.1 | 115.1 | 115.3 | 115.3 | 115.3 | 119.8 |
| OH number (end) (mg of KOH/g) | 27.3 | 22.2 | 25.3 | 25.2 | 23.6 | 25.9 | 26.0 | 39.4 |
| Acid number (end) (mg of KOH/g) | 67.5 | 75.5 | 74.7 | 72.4 | 79.1 | 76.8 | 70.2 | 70.0 |
| Acid number (end) (mg of KOH/g) | 71.1 | 80.4 | 71.2 | 70.9 | 78.7 | 78.1 | 69.9 | 70.4 |
| Amine number (end) (mg of KOH/g) | 28.5 | — | 14.0 | — | 27.6 | 27.9 | 27.8 | 27.6 |
| Siloxane in | i.m. | i.m. | feed | feed | i.m. | i.m. | i.m. | — | i.m. = initial mixture

TABLE 2

Clear paint compositions in parts

| Example | 1 | 2 | 3 | 4 | 5 | 6 | V1 | V2 | V3 |
|---|---|---|---|---|---|---|---|---|---|
| Copolym A1 | 53 |  |  |  |  |  |  |  |  |
| Copolym A3 |  | 53 |  |  |  |  |  |  |  |
| Copolym A3 |  |  | 53 |  |  |  |  |  |  |
| Copolym A4 |  |  |  | 53 |  |  |  |  |  |
| Copolym A5 |  |  |  |  | 53 |  |  |  |  |
| Copolym A6 |  |  |  |  |  | 53 |  |  |  |
| Copolym A7 |  |  |  |  |  |  | 53 |  |  |
| Copolym A8 |  |  |  |  |  |  |  | 53 | 53 |
| Polyester | 27 | 27 | 27 | 27 | 27 | 27 | 27 | 27 | 27 |
| Tinuvin ® 900 | 1 | 1 | 1 | 1 | 1 | 1 | 1 | 1 | 1 |
| Tinuvin ® 440 | 1 | 1 | 1 | 1 | 1 | 1 | 1 | 1 | 1 |
| Methoxypropanol | 18 | 18 | 18 | 18 | 18 | 18 | 18 | 17.99 | 17.9 |
| Fluoro surfactant | — | — | — | — | — | — | — | 0.01 | — |
| Silicone | — | — | — | — | — | — | — | — | 0.1 |
| Hardener solution 1 | 50 | 50 | 50 | 50 | 50 | 50 | 50 | 50 | 50 |
| Thinner 1 | 30 | 30 | 30 | 30 | 30 | 30 | 30 | 30 | 30 |

All the clear paints were formulated with thinner 1 to spray viscosity of a flow time of 18–20 seconds in a DIN 4 cup at 23° C. The solids content of the clear paints at the spray viscosity was 40–45%.

TABLE 3

Test results

| Example | 1 | 2 | 3 | 4 | 5 | 6 |
|---|---|---|---|---|---|---|
| Pendulum hardness (s)[1] | 76 | 67 | 63 | 60 | 70 | 75 |
| Dry to touch (minutes) | 20 | 30 | 60 | 75 | 20 | 20 |
| Taping test[2] | 3 | 3 | 1 | 0 | 3 | 3 |
| Gas spill test[3] | 10 | 10 | 10 | 10 | 10 | 10 |
| Gas spill test 10 cycles Volvo | 9 | 9 | —[9] | —[9] | 9 | 10 |
| Cupping index (mm) | 6 | 6 | 6 | 5 | 6 | 6 |
| Volvo test[4] 10 cycles | m3 g1 g.l.s. | m4 g1 l.s. | m5 g2 s.s. | m5 g3 s.s. | m2 g1 g.l.s. | m1 g1 g.l.s. |
| Scratch resistance[5] | l.m. | m. | m. | s.m. | l.m. | l.m. |
| Wetting angle[6] (°) | >90 | >90 | >90 | >90 | >90 | >90 |
| Capacity for overpainting[7] | OK | OK | NOK | NOK | OK | OK |
| Flow | OK | OK | NOK | NOK | OK | s.i.[10] |
| DOI[8] | 93 | 90 | 90 | 90 | 93 | 94 |
| Clouding | none | none | slight | slight | slight[11] | severe[12] |

[9] No longer assessable, impaired surface
[10] Flow slightly impaired
[11] Clouding disappears after stirring
[12] Clouding becomes less after stirring

TABLE 4

Test results

| Example | V1 | V2 | V3 |
|---|---|---|---|
| Pendulum hardness (s)[1] | —[9] | 71 | 70 |
| Dry to touch (minutes) | — | 45 | 45 |
| Taping test[2] | — | 1 | 1 |
| Gas spill test[3] | — | 5 | 5 |
| Gas spill test 10 cycles Volvo | 4 | 5 |  |
| Cupping index (mm) | — | 4.5 | 5 |
| Volvo test[4] 10 cycles | — | m5 g3 s.s. | m5 g3 s.s. |
| Scratch resistance[5] | s.m. | m. |  |
| wetting angle[6] (°) | — | 75–85 | 80–90 |
| Capacity for overpainting[7] | — | NOK | OK |
| Flow | — | OK | OK |
| DOI[8] | — | 81 | 82 |
| Clouding | — | none | none |

Explanations on Table 3 and Table 4:
[1] Pendulem hardness according to König in seconds
[2] Tesakrepp ® 4330 is stuck on the film and removed after 1 hour. The marking is evaluated visually: 3 = no marking, 2 = light marking, 1 = marking, 0 = sever marking
[3] 5 ml of comercially available super-grade gasoline are introduced onto the solid [sic] sheet placed at an angle of 45°. After 5 minutes, the marking is evaluated: 1 = very severe marking, 10 = no marking. This test is carried out sheets which have been dried for 1 hour at room temperature, 30 minutes at 60° C. and 24 hours at room temperature. This test is furthermore repeated on sheets which have benn exposed to 10 stress cycles in the Volvo test.
[4] The test sheets are exposed to 10 stress cycles, one cycle being composed as follows: 4 hours of storage at 50° C., followed by 2 hours of storage at 35° C. and 100% relative atmospheric humidity, followed by 2 hours of storage at 35° C., 100% relative atmospheric humidity and 2 l of So₂ [sic] per 300 l of air and finally 16 hours of storage at −30° C. The degree of blistering is then evaluated according to DIN 53 209 and [sic]: g.l.s. = gloss lightly swollen, l.a. = lightly swollen, s.s. = severly swollen.
[5] 250 g of sea sand were poured from a height of 1 m onto a test sheet, placed at an angle or 45°, over an area of 5 × 5 cm. The marking is then evaluated: l.m. lightly marked, m = marked, s.m. = severely marked.
[6] The wetting angle was measured using a drop of water.

TABLE 4-continued

Test results

| Example | V1 | V2 | V3 |
| --- | --- | --- | --- |

[7] The test sheets were dried at room temperature for 1 hour, at 60° C. for 30' and at room temperature (RT) for 24 h. The upper half of the test sheets was then sanded, dry, with 600 grade emery paper. The left half (sanded and non-sanded part) was then over-sprayed with a commercially available conventional base paint based on polyester resin, melamine resin and cellulose acetobutyrate (AE 54 from BASF Lacke + Farben AG, Münster). The entire test sheet was then coated with the particular cleat paint (dry film layer thickness 50–60 μm). The sheet was then dried at 60° C. for 30 minutes. The coating was subsequently evaluated visually: OK = no swelling is to be observed in any region.
[8] Measured using a 1792 unit from ATI Systems Inc., 32355 Howard Ave. Madison Heights, Michigan, USA
[9] The clear paint of Comparison Example 1 is very severly clouded. On spraying, severely impaired surfaces are obtained. Therefore no further tests were carried out.

Summary of the Test Results

Comparison of Examples 1 to 6 with Comparison Examples 1 to 3 shows that the resistance of the resulting coatings to gasoline is improved significantly by the incorporation of small amounts of the polysiloxane macromonomer $a_1$. The resistance of the resulting coatings to gasoline after stress (10 cycles in the Volvo test) is also improved significantly. The scratch resistance and surface smoothness of the resulting coating furthermore are also improved significantly.

Comparison of Example 1 with Comparison Example 2 moreover shows that the capacity of the resulting coatings for being overpainted is already achieved after storage at room temperature for 24 hours by the incorporation of small amounts of the polysiloxane macromonomer $a_1$, and that the top coat appearance is improved and that the short-term weathering results in the Volvo test are improved from an unacceptable level to an acceptable level.

Comparison of Examples 2 and 4 and of Examples 5 and 6 furthermore shows that the polysiloxane macromonomer $a_1$ is advantageously initially introduced into the reaction vessel in the preparation of copolymer A, but that acceptable results are also obtained if the polysiloxane macromonomer $a_1$ is metered in with the other monomers.

We claim:

1. A coating agent which comprises, as the binding agent, at least one polymer containing carboxyl groups and, as the hardener, at least one epoxy resin having on average more than one epoxide group per molecule, wherein: the binding agent comprises at least one acrylate copolymer (A) which comprises carboxyl groups and is prepared by solution polymerization using from 0.4 to 2.5% by weight, based on the total weight of the monomers, of one or more polysiloxane macromonomers $a_1$ having a number average molecular weight of 1000 to 40,000 and on average 0.5 to 2.5 ethylenically unsaturated double bonds per molecule, wherein copolymer A has a number average molecular weight of between 5000 and 25,000.

2. The coating agent according to claim 1, wherein the acrylate copolymer (A) is prepared using from 0.4 to 1% by weight, based on the total weight of the monomers, of one or more polysiloxane macromonomers $A_1$.

3. A coating agent according to claim 1, wherein the acrylate copolymer (A) is prepared using one or more polysiloxane macromonomers $a_1$ which is prepared by reaction of 70 to 99.999 mol % of a compound (1), represented by the formula (I)

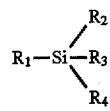

in which $R_1$ represents an aliphatic hydrocarbon group with 1 to 8 C atoms or a phenyl radical and $R_2$, $R_3$ and $R_4$ in each case represent a halogen radical or an alkoxy radical having 1 to 4 C atoms or a hydroxyl group, with 30 to 0.001 mol % of a compound (2), represented by the formula (II)

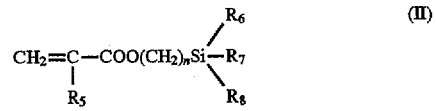

in which $R_5$ represents a hydrogen atom or a methyl radical, $R_6$, $R_7$ and $R_8$ in each case represent halogen, OH or an alkoxy radical having 1 to 4 C atoms or an aliphatic hydrocarbon group having 1 to 8 C atoms, at least one of the radicals $R_6$, $R_7$ or $R_8$ being halogen, OH or an alkoxy group, and n represents an integer from 1 to 6.

4. A coating agent according to claim 1, wherein the acrylate copolymer (A) is prepared using one or more polysiloxane macromonomers $a_1$ having the formula

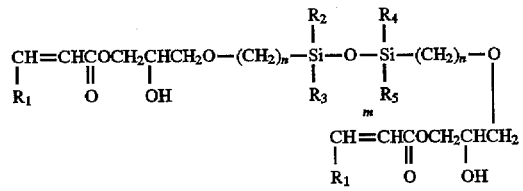

wherein $R_1$=H or $CH_3$ $R_2$, $R_3$, $R_4$ and $R_5$=identical or different aliphatic hydrocarbon radicals having 1 to 8 C atoms, in particular or the phenyl radical, n=2 to 5, and m=8 to 30.

5. A coating agent according to claim 4, wherein, in the formula for the polysiloxane macromonomers $a_1$, $R_2$, $R_3$, $R_4$ and $R_5$=identical or different aliphatic hydrocarbon radicals selected from the group consisting of the methyl and phenyl radicals, and n=3.

6. A coating agent according to claim 1, wherein the acrylate copolymer (A) containing carboxyl groups is prepared by copolymerization of $a_1$) 0.05 to 2.5% by weight, of one or more polysiloxane macromonomers $a_1$, $a_2$) 0 to 40% by weight, of one or more ethylenically unsaturated monomers containing carboxyl groups, $a_3$) 0 to 40% by weight, of one or more vinylaromatic hydrocarbons, $a_4$) 0 to 99.95% by weight, of one or more ethylenically unsaturated monomers containing hydroxyl groups, $a_5$) 0 to 30% by weight, of one or more monomers having at least two polymerizable, ethylenically unsaturated double bonds and $a_6$) 0 to 80% by weight of one or more other ethylenically unsaturated copolymerizable monomers, wherein the sum of the parts by weight of components $a_1$ to $a_6$ is in each case 100% by weight and wherein the amounts of components $a_2$ and $a_4$ employed should not both simultaneously be zero, and when component $a_4$ is present, the copolymer obtained therewith is reacted with a carboxylic acid anhydride in an amount sufficient to produce a copolymer with an acid number of from 40 to 150 mg of KOH/g.

7. A coating agent according to claim 1, wherein the acrylate copolymer (A) containing carboxyl groups is prepared by copolymerization of $a_1$) 0.05 to 0.5% by weight, of one or more polysiloxane macromonomers $a_1$, $a_2$) 0 to 30% by weight, of one or more ethylenically unsaturated monomers containing carboxyl groups, $a_3$) 0 to 30% by weight, of one or more vinylaromatic hydrocarbons, $a_4$) 20 to 60% by weight, of one or more ethylenically unsaturated monomers containing hydroxyl groups, $a_5$) 0 to 20% by weight, of one or more monomers having at least two polymerizable, ethylenically unsaturated double bonds and $a_6$) 0 to 80% by weight of one or more other ethylenically unsaturated copolymerizable monomers, wherein the sum of the parts by weight of components $a_1$ to $a_6$ is in each case 100% by weight, and wherein the amounts of components $a_2$ and $a_4$ employed should not both simultaneously be zero, and when component $a_4$ is present, the copolymer obtained therewith is reacted with a carboxylic acid anhydride in an amount sufficient to produce a copolymer with an acid number of from 40 to 150 mg of KOH/g.

8. A coating agent according to claim 1, wherein the hardener, is selected from the group consisting of polar epoxides based on a reaction product of melamine resins with acrylamide with subsequent epoxidation of the acrylic double bond.

9. A process for the preparation of the coating agent according to claim 1, comprising the steps of mixing the acrylate copolymer(s) (A) and the epoxy resin(s) with one or more organic solvents to form a first mixture, and then optionally dispersing in the first mixture at least one member selected from the group consisting of pigments, fillers and further additives other than fillers.

10. A process according to claim 9, wherein characterized in that the acrylate copolymer (A) containing carboxyl groups is prepared by solution polymerization at temperatures of between 90° and 160° C. using one or more polymerization initiators, by 1.) initially introducing at least 10% by weight of the total amount of the polysiloxane macromonomer $a_1$ into the reaction vessel and 2.) metering in the other components and any remainder of the polysiloxane macromonomer $a_1$ which still exists.

11. The process according to claim 10, wherein 100% by weight of the total amount of the polysiloxane macromonomer and optionally at least 60% by weight of the total amount of a vinyl ester of aliphatic monocarboxylic acids which are branched in the α-position and have 5 to 15 C atoms per molecule are initially introduced into the reaction vessel.

12. A process for coating substrates, wherein a coating agent according to claim 1 is applied.

13. The coating agents according to claim 1, comprising an automotive repair coating composition.

14. The coating agents according to claim 1, comprising a clear coat composition.

15. The coating agents according to claim 1, comprising a clear coat composition for multilayer metallic painting.

16. The coating agents according to claim 1, comprising a top coat coating composition.

17. The coating composition of claim 1, wherein the epoxy resin is an acrylate copolymer which comprises epoxide groups and is prepared by solution polymerization using between 0.05 and 2.5% by weight, based on the total weight of the monomers employed for the preparation of copolymer, of one or more polysiloxane macromonomers $a_1$ having a number-average molecular weight of 1000 to 40,000 and on average 0.5 to 2.5 ethylenically unsaturated double bonds per molecule, and having a number average molecular weight of between 800 and 2200 and an epoxide equivalent weight of between 250 and 550.

18. A coating agent according to claim 17, wherein characterized in that the acrylate copolymer comprising epoxide groups is prepared using one or more polysiloxane macromonomers $a_1$ which is prepared by reaction of 70 to 99.999 mol % of a compound (1), represented by the formula (I)

in which $R_1$ represents an aliphatic hydrocarbon group with 1 to 8 C atoms or a phenyl radical and $R_2$, $R_3$ and $R_4$ in each case represent a halogen radical or an alkoxy radical having 1 to 4 C atoms or a hydroxyl group, with 30 to 0.001 mol % of a compound (2), represented by the formula (II).

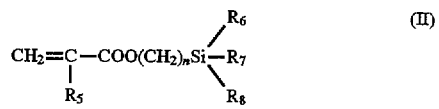

in which $R_5$ represents a hydrogen atom or a methyl radical, $R_6$, $R_7$ and $R_8$ in each case represent halogen, OH or an alkoxy radical having 1 to 4 C atoms or an aliphatic hydrocarbon group having 1 to 8 C atoms, at least one of the radicals $R_6$, $R_7$ or $R_8$ being halogen, OH or an alkoxy group, and n represents an integer from 1 to 6.

19. A coating agent according to claim 17, wherein characterized in that the acrylate copolymer comprising epoxide groups is prepared using one or more polysiloxane macromonomers $a_1$ having the formula

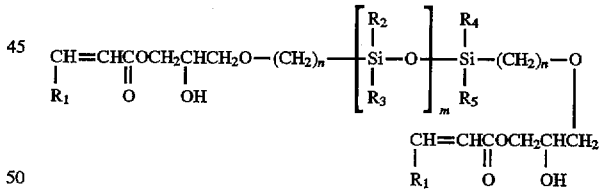

where $R_1$=H or $CH_3$ $R_2$, $R_3$, $R_4$ and $R_5$=identical or different aliphatic hydrocarbon radicals having 1 to 8 C atoms, or the phenyl radical n=2 to 5, m=8 to 30.

20. A coating agent according to claim 1, wherein further characterized in that at least one copolymer (A) is prepared by solution polymerization using from 0.4 to less than 1.0% by weight, based on the total weight of monomers employed for the preparation of copolymer (A), of one or more polysiloxane macromonomers $a_1$.

* * * * *